(12) United States Patent  
Akuta et al.

(10) Patent No.: US 8,180,530 B2
(45) Date of Patent: May 15, 2012

(54) STEERING CONTROL DEVICE (75) Inventors: Yoshimitsu Akuta, Wako (JP); Masaaki Minakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 12/411,807

(22) Filed: Mar. 26, 2009

(65) Prior Publication Data

US 2009/0248248 A1 Oct. 1, 2009

(30) Foreign Application Priority Data

Mar. 28, 2008 (JP) ................. 2008-086085

(51) Int. Cl.
*B62D 6/00* (2006.01)
(52) U.S. Cl. ................. 701/41; 180/443; 180/446
(58) Field of Classification Search ............ 701/41; 280/93.514; 180/443, 445, 446
See application file for complete search history.

(56) References Cited

U.S. PATENT DOCUMENTS

| 6,450,287 | B1 * | 9/2002 | Kurishige et al. ............ 180/446 |
| 2003/0065430 | A1 | 4/2003 | Lu et al. |
| 2005/0222728 | A1 | 10/2005 | Hac et al. |
| 2007/0216125 | A1 * | 9/2007 | Baxter .................... 280/93.514 |

FOREIGN PATENT DOCUMENTS

| JP | 5-131945 | 5/1993 |
| JP | 5131945 | 5/1993 |
| JP | 2004-050978 | 2/2004 |

* cited by examiner

*Primary Examiner* — Eric Culbreth
(74) *Attorney, Agent, or Firm* — Rankin, Hill & Clark LLP (57) ABSTRACT

In a steer-by-wire steering control device for a vehicle using a model following control based on yaw rate or lateral acceleration, the target steering angle(s) of front wheels and/or rear wheels (Sfbs, Srbs) are corrected according a roll rate (Rre) of the vehicle which may be either detected or estimated from a lateral acceleration or yaw rate. Thereby, the roll rate gain can be reduced, and the damping property and response property of the yaw rate can be improved.

8 Claims, 9 Drawing Sheets

STEERING CONTROL DEVICE

TECHNICAL FIELD

The present invention relates to an electrically or otherwise actuated steering control device for a vehicle, and in particular to a technology for stabilizing the motion of a vehicle as it makes a turn.

BACKGROUND OF THE INVENTION

In recent years, various proposals have been made to develop steer-by-wire systems that use an electric or hydraulic actuator for steering either front wheels or rear wheels to enable the corresponding wheels to be steered without using a mechanical coupling between a steering wheel and the road wheels that are steered. See Japanese patent laid open publication (kokai) No. 2004-50978 and Japanese patent laid open publication (kokai) No. 05-131945. When a steer-by-wire system is used, the lateral acceleration (yaw rate) property of the vehicle at the time of cornering and changing lanes can be determined as desired by using a lateral acceleration model following control, yaw rate model following control or the like.

According to simulations (theoretical computations) conducted by the inventors, when a lateral acceleration model following control (or yaw rate model following control) is used, it was found that the lateral acceleration response and the settling property thereof in a high frequency range of the steering input can be improved, but a certain problem arises.

Figure 9:
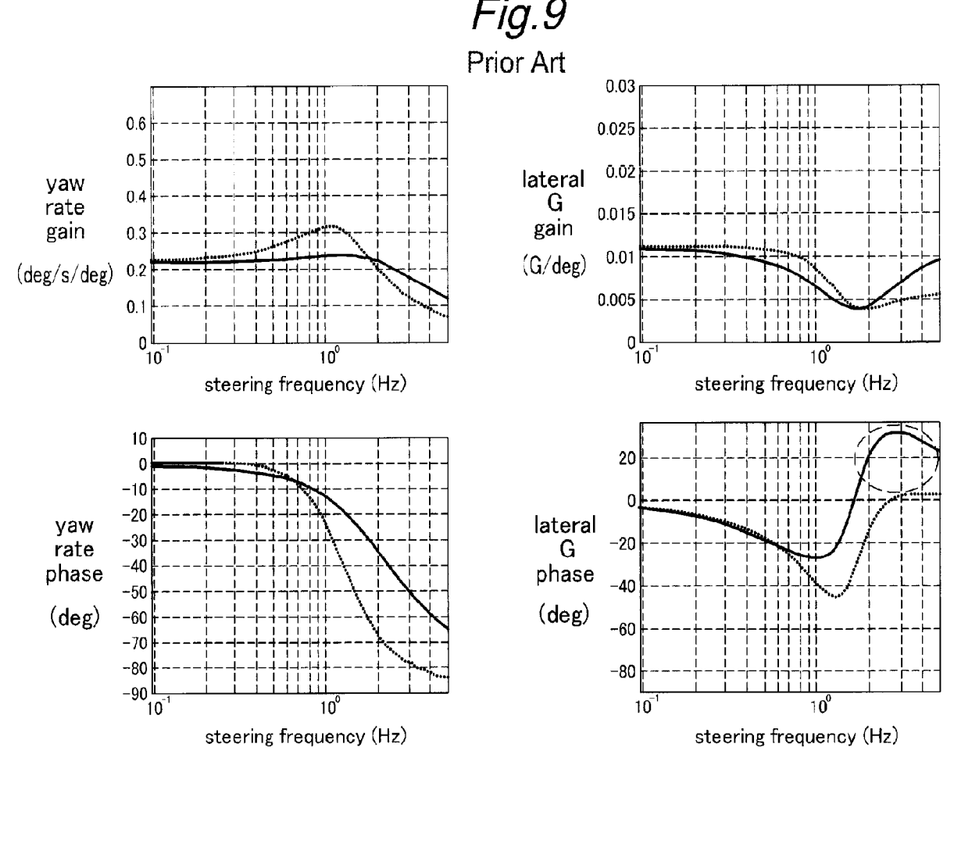
FIG. 9 represents graphs showing results of simulation of a conventional arrangement.

FIG. 9 shows graphs representing frequency responses (lateral acceleration and yaw rate response), in terms of both gain and phase, to a steering input when a yaw rate following control is used. As can be appreciated from these graphs, the yaw rate following control improves both the yaw rate response and settling property thereof (indicated by the solid line) as compared to the case where the yaw rate following control is not used (indicated by the dotted line). However, some advance in phase occurs to the lateral acceleration in a high steering frequency range, for instance, as indicated by the dotted circle in FIG. 9, and this is perceived by a vehicle occupant as a delayed disturbance following the settling of the motion of the vehicle which may cause a discomfort to the vehicle occupant. In other words, depending on the extent of the desired improvement in the yaw rate response, the timing of a rise in lateral acceleration may become unstable, and this in turn may cause an unstable rolling motion of the vehicle.

BRIEF SUMMARY OF THE INVENTION

In view of such problems of the prior art, a primary object of the present invention is to provide an electric controlled steering control device based on a model Following control that can stabilize the motion of a vehicle as it makes a turn.

According to the present invention, such an object can be at least partly accomplished by providing a steering control device for a vehicle including a power actuator for steering at least rear or front wheels, comprising: a steering amount determining unit for determining a steering amount according to at least one of a manual input by a vehicle operation and a dynamic state of the vehicle; a roll rate determining unit for determining a roll rate of the vehicle; and a correction amount determining unit for determining a correcting amount by which the steering amount is corrected according to the determined roll rate of the vehicle.

Thereby, the roll rate gain can be reduced, and the damping property and response property of the yaw rate can be improved when performing a model following control based on yaw rate or lateral acceleration. Also, the swing back in the vehicle motion owing to a phase advance in the lateral acceleration can be controlled.

The roll rate can be detected by using a roll rate sensor, but can also be estimated by using a lateral G sensor or yaw rate sensor. In the latter case, the need for a roll rate sensor can be eliminated, and this avoids an increase in the number of component parts and minimizes the manufacturing cost.

The power actuator typically comprises an electric power actuator, but may also comprise other actuators such as hydraulic actuators.

According to a preferred embodiment of the present invention, a ratio of a steering angle of rear wheels to a steering angle of front wheel is determined by a dynamic condition of the vehicle, and the steering angles of both the front and rear wheels are corrected according to the determined roll rate of the vehicle.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
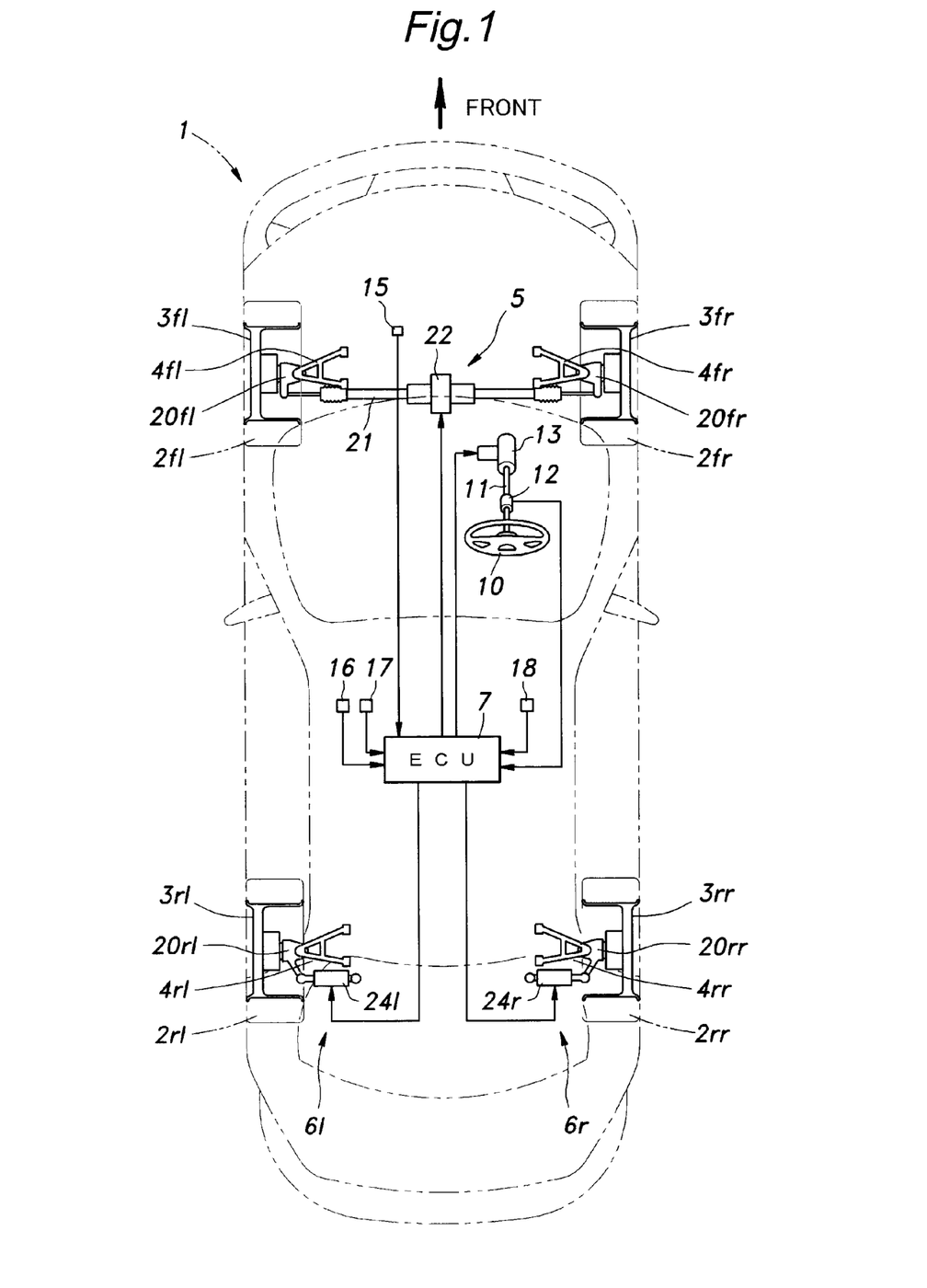
FIG. 1 is a diagram of a four wheel steering vehicle incorporated with a steering control device embodying the present invention.

FIG. 1 shows a vehicle incorporated with a steer-by-wire four wheel steering system. In FIG. 1, each wheel and associated components such as a tire and a suspension system are denoted with suffixes such as "fl" (front left), "fr" (front right), "rl" (rear left) and "rr" (rear right) in addition to the corresponding numeral to indicate the positioning of the corresponding component such as "left front wheel 3fl and right rear wheel 3rr". When the various components are generally referred to, they are collectively denoted only with the corresponding numeral, such as "wheels 3".

Referring to FIG. 1, a vehicle body 1 of the vehicle is fitted with a pair of front wheels 3fl and 3fr fitted with tires 2fl and 2fr, respectively, and rear wheels 3rl and 3rr fitted with tires 2rl and 2rr, respectively. These front and rear wheels 3 are supported by the vehicle body 1 via corresponding front wheel and rear wheel suspension systems 4. The vehicle body 1 further comprises a front wheel steering device 5 for steering the front wheels 3fl and 3fr, a right wheel steering device 6r that individually steers the right rear wheel, a left rear wheel steering device 6l that individually steers the left rear wheel 3rl, and a steering ECU (electronic control unit) 7 for controlling the operation of the front wheel steering device 5 and right and left rear wheel steering devices 6l and 6r.

In front of a vehicle driver's seat is provided a steering wheel 10 which is connected to a steering shaft 11. The steering shaft 11 is provided with a steering angle sensor 12 for detecting an angular position of the steering wheel 10 and a reaction actuator 13 for applying a steering reaction to a steering effort applied to the steering wheel 10. Thus, there is no mechanical connection between the steering wheel 10 and wheels 3 that are steered. The vehicle body 1 is fitted with a vehicle speed sensor 15 for detecting a vehicle speed, a lateral G sensor 16 for detecting a lateral acceleration and a yaw rate sensor 17 for detecting a yaw rate of the vehicle in appropriate parts thereof.

The front wheel steering device 5 includes a steering gear 21 having two output ends that are connected to the front wheel knuckles 20fl and 20fr, respectively, and a front wheel steering power actuator 22 that actuates the steering gear 21. In the illustrated embodiment, the power actuator 22 essentially consists of an electric motor, but may also consist of other actuators such as a hydraulic actuator. Each rear wheel steering device 6 comprises a rear wheel steering power actuator 24 interposed between the vehicle body 1 and a corresponding rear wheel knuckle 20 and a position sensor not shown in the drawing for detecting a steering angle of the corresponding rear wheel. Likewise, each power actuator 24 essentially consists of an electric motor, but may also consist of other actuators such as a hydraulic actuator.

Figure 2:
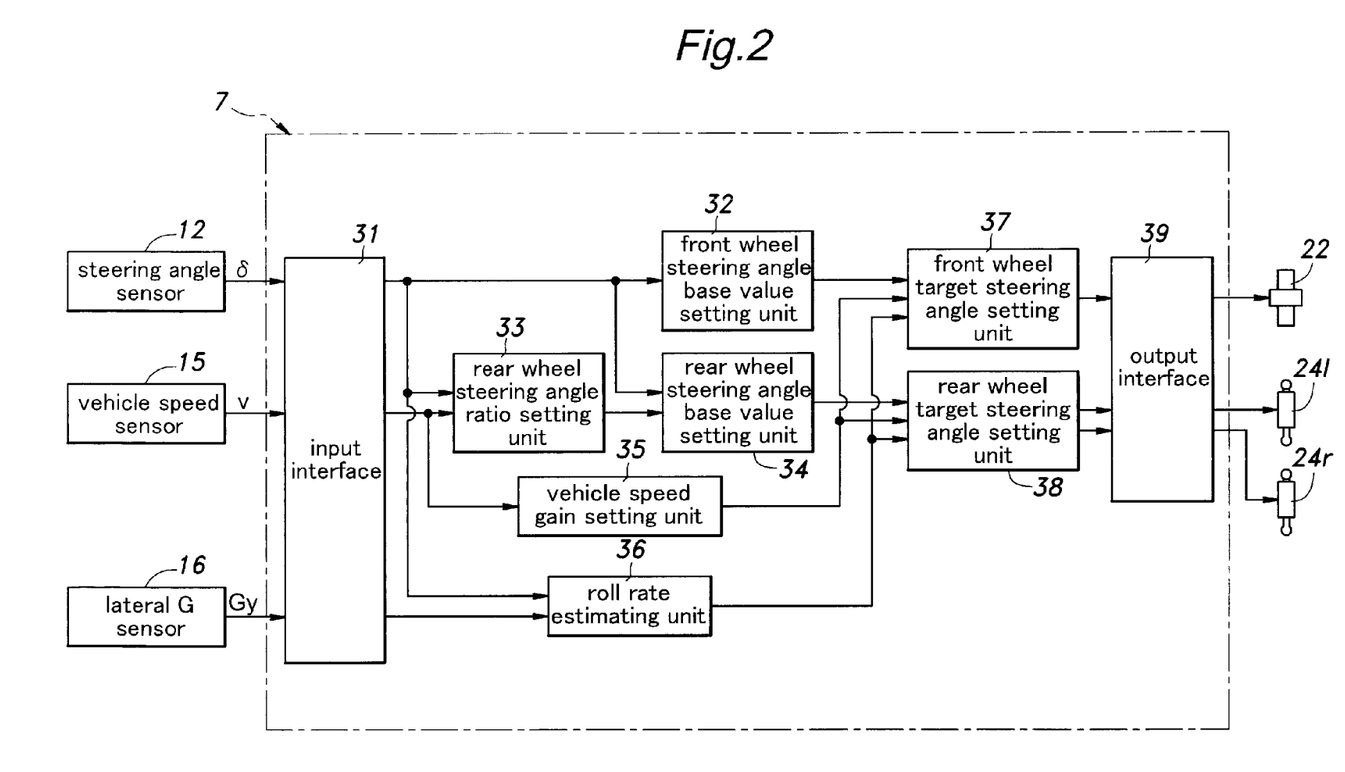
FIG. 2 is a block diagram of a steering ECU of the steering control device according to the present invention.

The steering ECU 7, shown in FIG. 2, includes a microcomputer, ROM, RAM, a peripheral circuit, an input/output interface and various drivers, and is connected to the various sensors such as the steering angle sensor 12, the vehicle speed sensor 15, the lateral G sensor 16, the yaw rate sensor 17, and front wheel steering device 5 and rear wheel steering devices 6 via a communication line such as CAN (controller area network). The ECU 7 is incorporated with various functional units such as an input interface 31, a front wheel steering angle base value setting unit 32, a rear wheel steering angle ratio setting unit 33, a rear wheel steering angle base value setting unit 34, a vehicle speed gain setting unit 35, a roll rate estimating unit 36, a front wheel steering angle target value setting unit 37, a rear wheel steering angle target value setting unit 38 and an output interface 39.

The input interface 31 is connected to the steering angle sensor 12, the vehicle speed sensor 15, the lateral G sensor 16, and the yaw rate sensor 17, and the front wheel steering angle base value setting unit 32 determines a front wheel steering angle base value according to the detection result of the steering angle sensor 12. The rear wheel steering angle ratio setting unit 33 determines the steering angle ratio of the rear wheels to the front wheels according to the detection results of the steering angle sensor 12 and vehicle speed sensor 15. The rear wheel steering angle base value setting unit 34 determines a rear wheel steering angle base value according to the detection result of the steering angle sensor 12 and the output of the rear wheel steering angle ratio setting unit 33. The vehicle speed gain setting unit 35 determines a vehicle speed gain according to the detection result of the vehicle speed sensor 15. The roll rate estimating unit 36 estimates a roll rate of the vehicle according to the detection results of the steering angle sensor 12 and lateral G sensor 16. The front wheel target steering angle setting unit 37 determines a target steering angle of the front wheels by suitably modifying the steering angle base value of the front wheels with the vehicle speed gain and roll rate. The rear wheel target steering angle setting unit 38 determines a target steering angle of the rear wheels by suitably modifying the steering angle base value of the rear wheels with the vehicle speed gain and roll rate. The output interface 39 outputs the determination results of the front wheel target steering angle setting unit 37 and rear wheel target steering angle setting unit 38 to the power actuators 22 and 24 of the front wheel steering device 5 and rear wheel steering devices 6.

Figure 3:
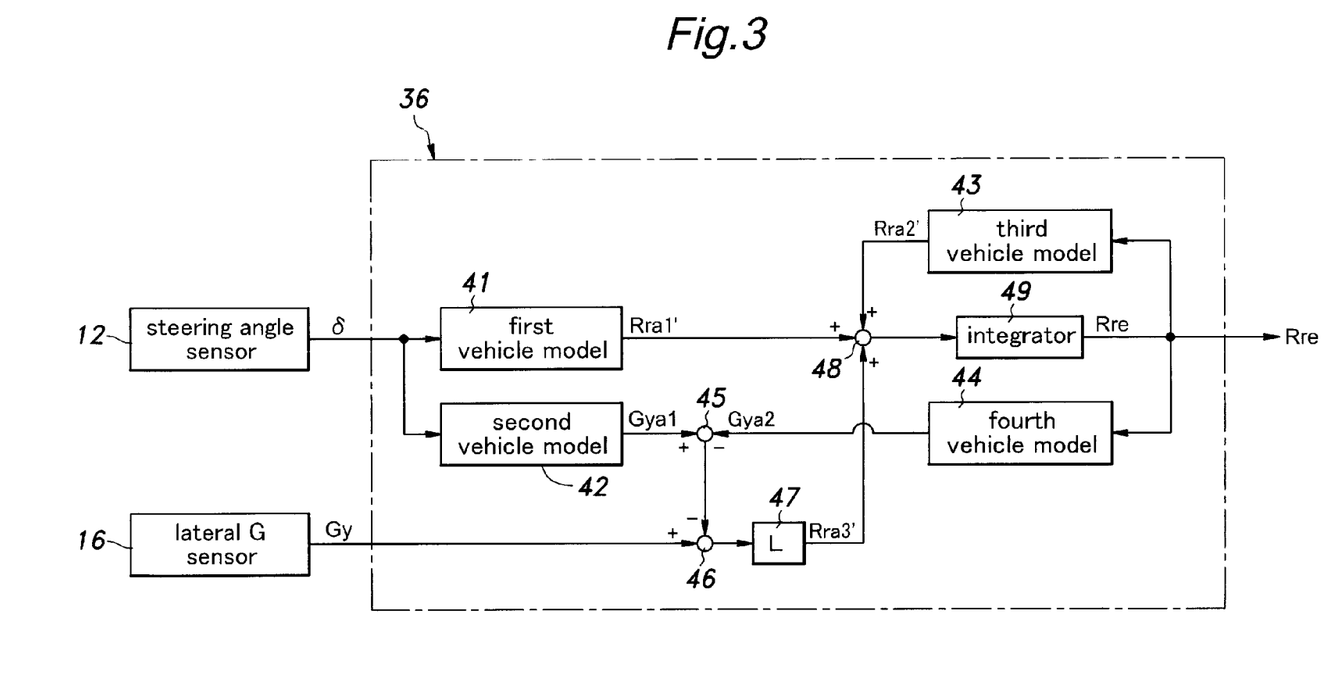
FIG. 3 is a block diagram of the roll rate estimating unit.

FIG. 3 shows the roll rate estimating unit 36 in greater detail. The roll rate estimating unit 36 comprises a first vehicle model 41 for computing a first roll rate change Rra1' according to the detection result of the steering angle sensor 12, a second vehicle model 42 for computing a first lateral acceleration estimated value Gya1 according to the detection result of the steering angle sensor 12, a third vehicle model 43 for computing a second roll rate change Rra2' according to a roll rate estimated value Rre which will be described hereinafter, a fourth vehicle model 44 for computing a second lateral acceleration estimated value Gya2 according to the roll rate estimated value Rre, a first subtractor 45 for subtracting the second lateral acceleration estimated value Gya2 from the first lateral acceleration estimated value Gya1, a second subtractor 46 for subtracting the output of the first subtractor 45 from the lateral acceleration Gy detected by the lateral G sensor 16, a gain block 47 for obtaining a third roll rate change Rra3' by multiplying a prescribed observer gain to the output of the second subtractor 46, an adder 48 for adding up the first to third roll rate changes Rra1' to Rra3', and an integrator 49 for computing the roll rate estimated value Rre by integrating the output of the adder 48.

Figure 4:
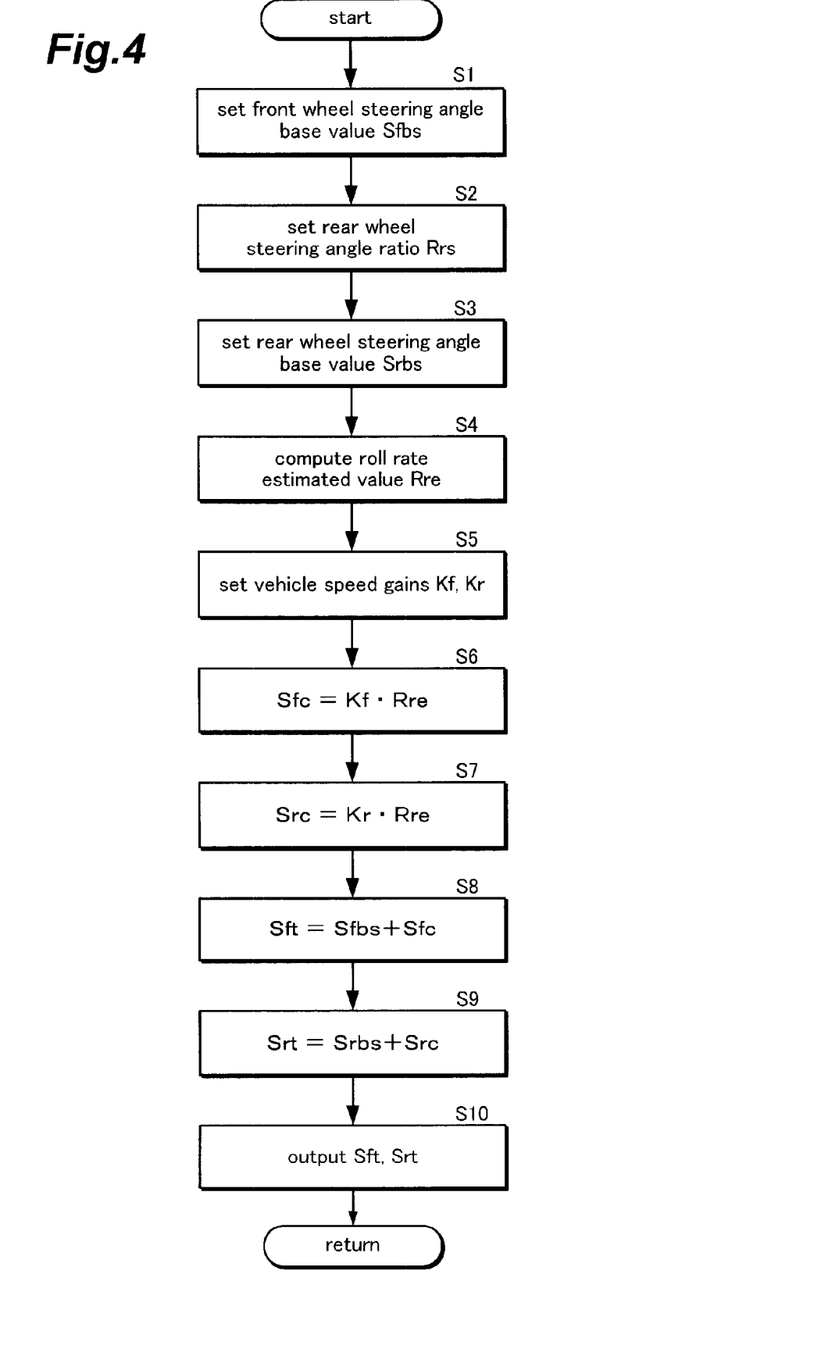
FIG. 4 is a flowchart showing the control process of the steering control device embodying the present invention.
Figure 5:
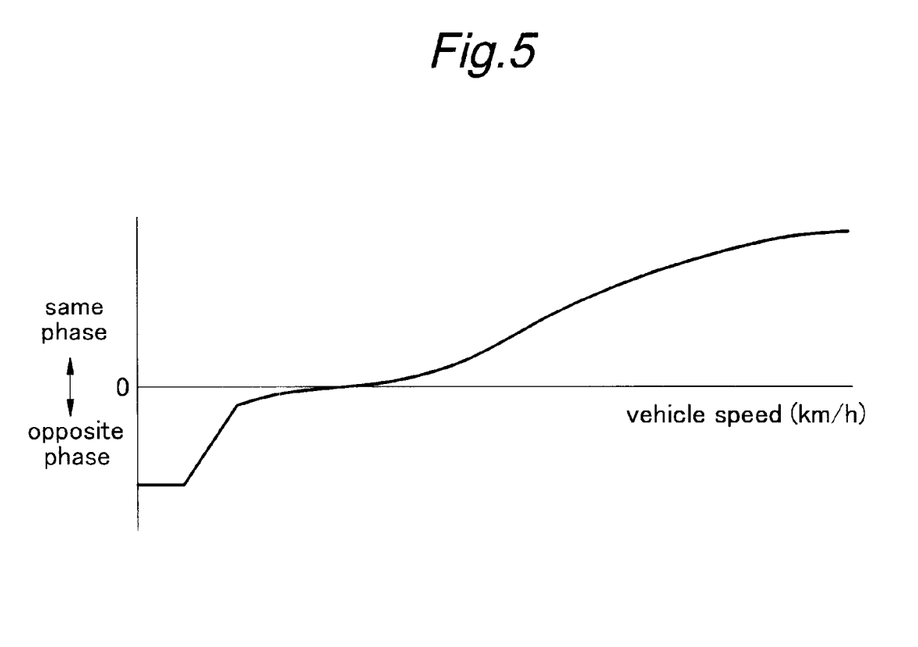
FIG. 5 is a map representing the relationship between the vehicle speed and rear wheel steering angle ratio.

During the operation of the vehicle, the front and rear wheels steering control illustrated in the flowchart of FIG. 4 is executed by the steering ECU 7 at a prescribed processing interval. First of all, a front wheel steering angle base value Sfbs is determined by the steering ECU 7 according to the steering angle δ received from the steering angle sensor 12 in step S1. A rear wheel steering angle ratio Rrs is looked up from a vehicle speed-rear steering angle ratio map shown in FIG. 5 for the current vehicle speed v received from the vehicle speed sensor 15 in step S2. The rear wheel steering angle base value Srbs is determined by multiplying the rear wheel steering angle ratio Rrs by the front wheel steering angle base value Sfbs in step S3.

The steering ECU 7 then computes a roll rate estimated value Rre according to the steering angle δ and a lateral acceleration Gy received from the lateral G sensor 16 in step S4, and sets a front wheel vehicle speed gain Kf and a rear wheel vehicle speed gain Kr according to the vehicle speed v by using a map or formula not shown in the drawings in step S5. The front wheel steering angle correction value Sfc is computed by multiplying the front wheel vehicle speed gain Kf by the roll rate estimated value Rre in step S6, and the rear wheel steering angle correction value Src is computed by multiplying the rear wheel vehicle speed gain Kr by the roll rate estimated value Rre in step S7.

The front wheel target steering angle Sft is computed by adding the front wheel steering angle correction value Sfc to the front wheel steering angle base value Sfbs in step S8, and the rear wheel target steering angle Srt is computed by adding the rear wheel steering angle correction value Src to the rear wheel steering angle base value Srbs in step S9. Thereafter, the front wheel target steering angle Sft and rear wheel target steering angle Srt are forwarded to the front wheel steering device 5 (front wheel steering power actuator 22) and the rear wheel steering devices 6 (rear wheel steering power actuators 24) in step S10.

Figure 6:
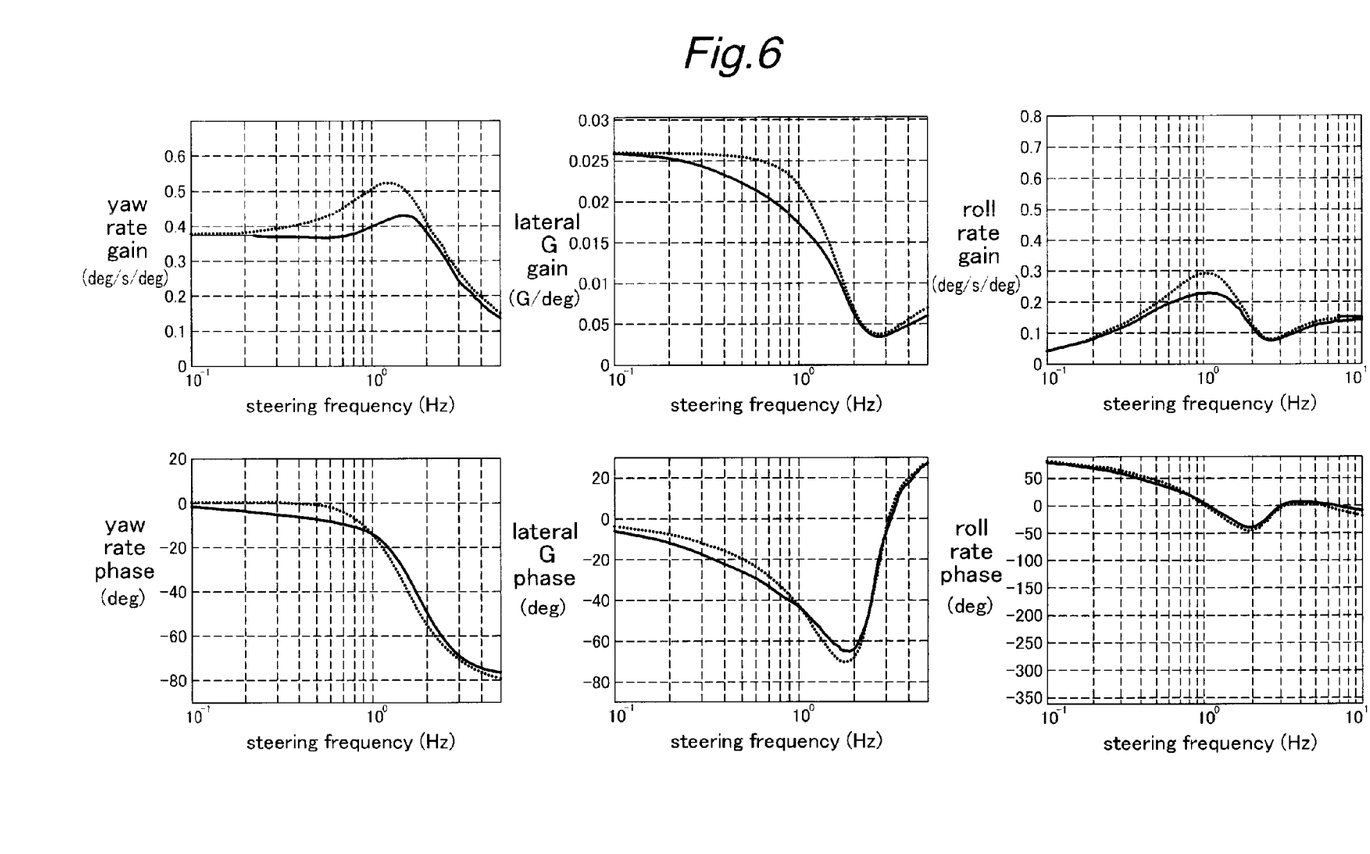
FIG. 6 represents graphs showing results of simulation of the illustrated embodiment when only the front wheel steering target value is corrected by the roll rate estimated value.
Figure 7:
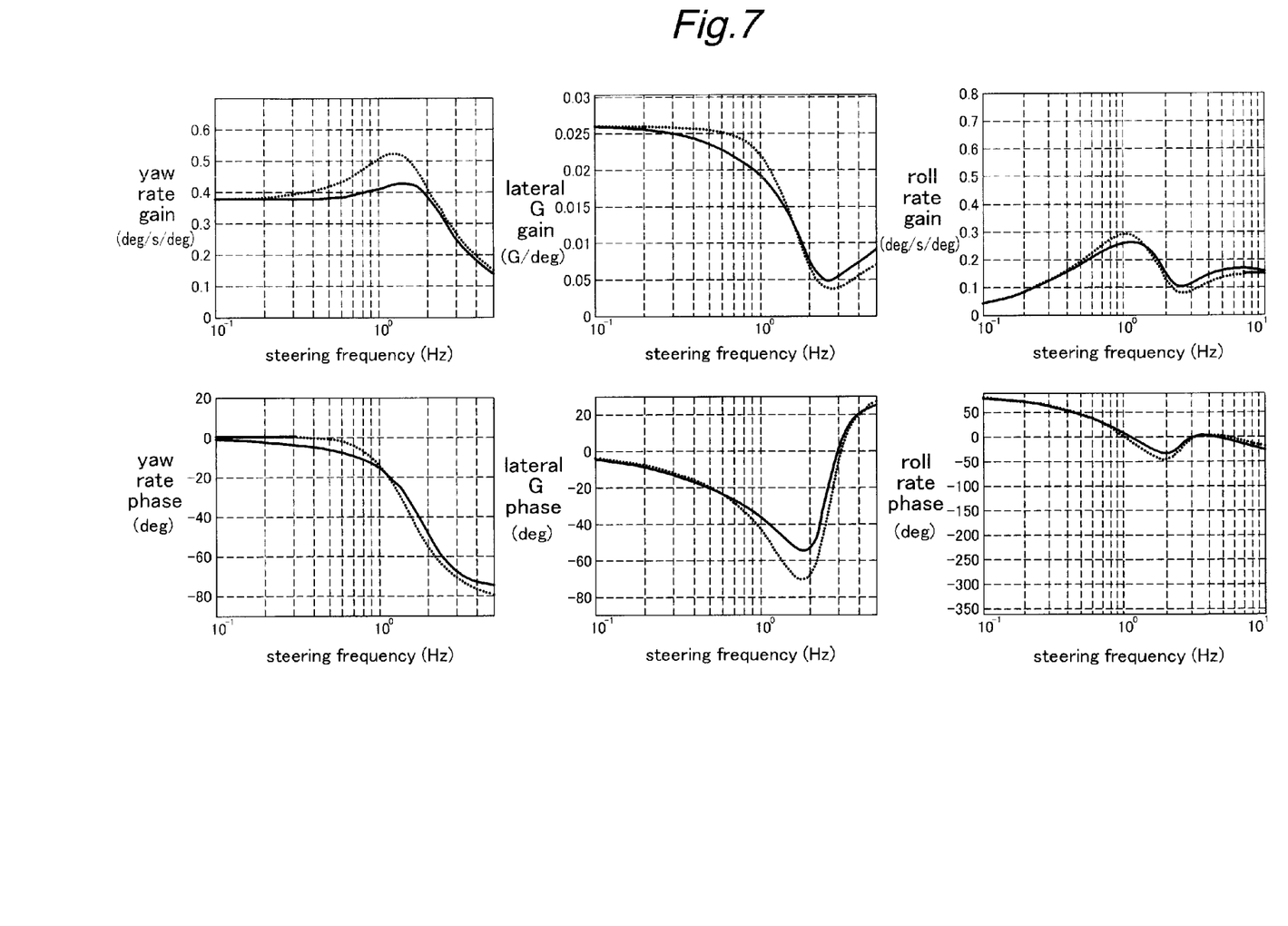
FIG. 7 represents graphs showing results of simulation of the illustrated embodiment when only the rear wheel steering target value is corrected by the roll rate estimated value.
Figure 8:
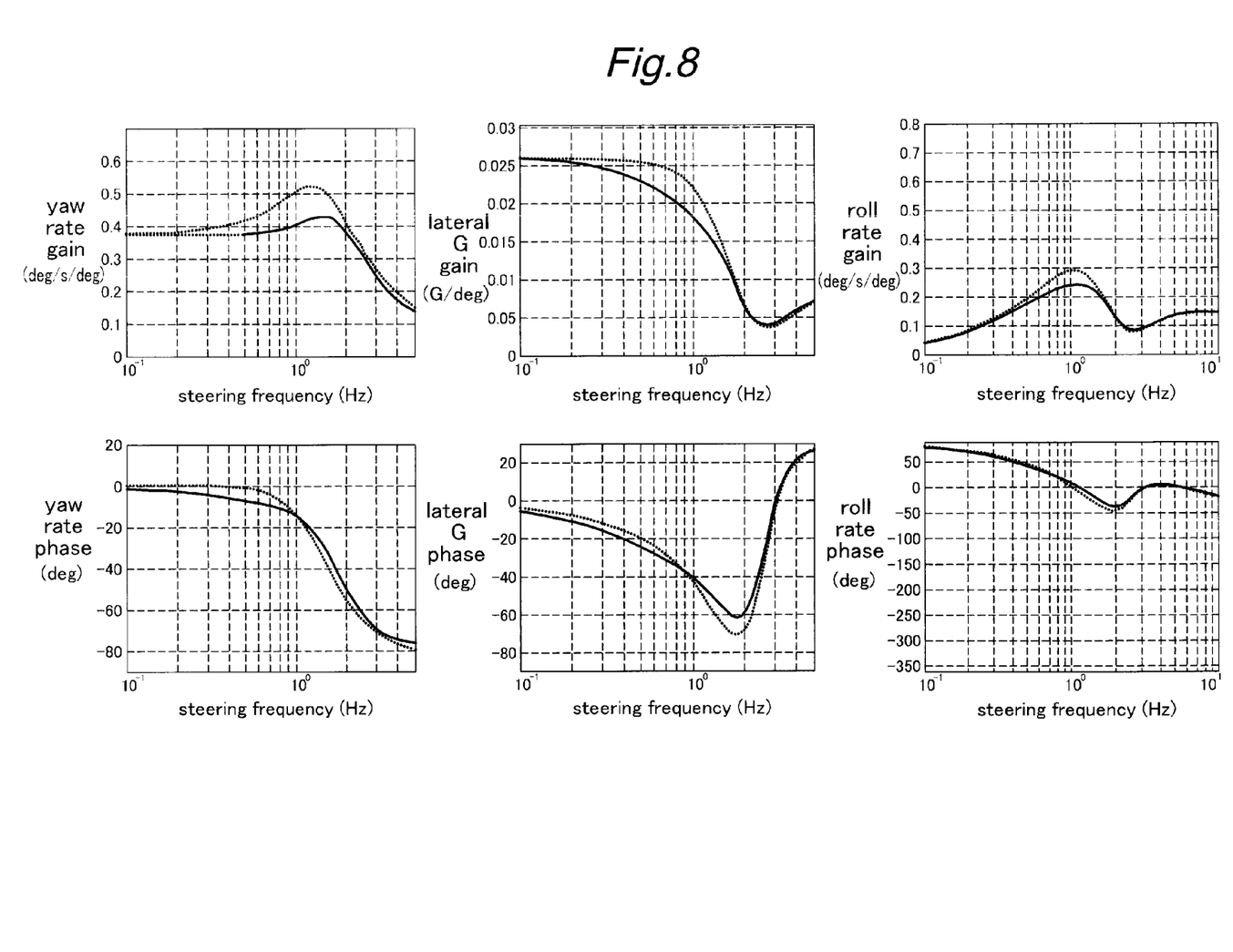
FIG. 8 represents graphs showing results of simulation of the illustrated embodiment when the front wheel steering angle target value and rear wheel steering target value are both corrected by the roll rate estimated value.

FIGS. 6 to 8 are graphs showing the results of simulation conducted on the embodiment of the present invention. They show the relationships of gain and phase to the steering frequency with respect to the yaw rate, lateral acceleration and roll rate. The simulation was conducted under a same vehicle speed, and the solid line curves represent the cases where the correction was made while the dotted line curves represent the cases where the correction was not made.

FIG. 6 shows the result of a simulation in which the front wheel target steering angle Sft is corrected by the roll rate estimated value Rre, and demonstrates that not only the resonance in the roll rate gain is reduced (or the roll rate gain near 1 Hz is reduced) and the damping property and response of the yaw rate in a frequency range above 1 Hz are improved, but also the phase advance of the lateral acceleration in a frequency range above 3 Hz is avoided. Thereby, the swing back following the settling of the vehicle motion which has been a problem with the conventional devices can be controlled.

FIG. 7 shows the result of a simulation in which the rear wheel target steering angle Srt is corrected by the roll rate estimated value Rre, and demonstrates that not only the resonance in the roll rate gain is reduced (or the roll rate gain near 1 Hz is reduced) and the damping property and response of the yaw rate and lateral acceleration in a frequency range of 1 to 2 Hz are improved.

FIG. 8 shows the result of a simulation in which the front wheel target steering angle Sft and rear wheel target steering angle Srt are both corrected by the roll rate estimated value Rre, and demonstrates that the increase in the roll rate gain above 2 Hz which was the problem when only the rear wheel target steering angle Srt is corrected can be controlled, and the damping properties and response properties of the yaw rate and lateral acceleration in a frequency range of 1 to 2 Hz are improved. In other words, the effect of the correction on the front wheel target steering angle Sft and the effect of the correction on the rear wheel target steering angle Srt can be achieved in a favorably balanced manner.

Although the present invention has been described in terms of a preferred embodiment thereof, it is obvious to a person skilled in the art that various alterations and modifications are possible without departing from the scope of the present invention which is set forth in the appended claims. For instance, the front and rear wheels were both actuated by corresponding electric actuators in the illustrated embodiment, but only the front wheels or rear wheels may be actuated by using electric or other power actuators. Also, the present invention is not only applicable to fully steer-by-wire systems but also to other types of steering systems such as the one using a different gear system in a linkage between a steering wheel and road wheels that are steered so that the ratio of the steering wheel angle to the road wheel steered angle may be varied by an additive or subtractive process.

The roll rate was estimated from the steering angle and lateral acceleration in the illustrated embodiment, but may also be estimated from the steering angle and yaw rate or detected by using a roll rate sensor mounted on the vehicle.

The contents of the original Japanese patent application on which the Paris Convention priority claim is made for the present application are incorporated in this application by reference.

The invention claimed is:

1. A steering control device for a vehicle including a power actuator for steering at least one of rear and front wheels, comprising:
a steering amount determining unit for determining a steering amount according to at least one of a manual input by a vehicle operation and a dynamic state of the vehicle;
a roll rate determining unit for determining a roll rate of the vehicle; and
a correction amount determining unit for determining a correcting amount by which the steering amount is corrected according to the determined roll rate of the vehicle;
wherein the correction amount determining unit computes the correcting amount by multiplying a vehicle speed gain determined from a vehicle speed by the roll rate, and adding the correcting amount to the steering amount determined by the steering amount determining unit.

2. The steering control device according to claim 1, wherein the roll rate determining unit comprises a roll rate sensor.

3. The steering control device according to claim 1, wherein the roll rate determining unit estimates the roll rate.

4. The steering control device according to claim 3, wherein the roll rate determining unit estimates the roll rate according to at least one of a lateral acceleration and yaw rate of the vehicle.

5. The steering control device according to claim 1, wherein the power actuator comprises an electric power actuator.

6. The steering control device according to claim 1, wherein a ratio of a steering angle of rear wheels to a steering angle of front wheel is determined by a dynamic condition of the vehicle, and the steering angles of both the front and rear wheels are corrected according to the determined roll rate of the vehicle.

7. The steering control device according to claim 1, wherein the power actuator steers the rear and front wheels.

8. The steering control device according to claim 1, wherein the vehicle is incorporated with a steer-by-wire steering system.

* * * * *